(12) United States Patent
Press

(10) Patent No.: US 12,371,118 B2
(45) Date of Patent: Jul. 29, 2025

(54) SEAT POST

(71) Applicant: Ulrich Press, Munich (DE)

(72) Inventor: Ulrich Press, Munich (DE)

( * ) Notice: Subject to any disclaimer, the term of this patent is extended or adjusted under 35 U.S.C. 154(b) by 742 days.

(21) Appl. No.: 17/639,294

(22) PCT Filed: Aug. 25, 2020

(86) PCT No.: PCT/EP2020/073712
§ 371 (c)(1),
(2) Date: Feb. 28, 2022

(87) PCT Pub. No.: WO2021/037832
PCT Pub. Date: Mar. 4, 2021

(65) Prior Publication Data
US 2022/0340221 A1 Oct. 27, 2022

(30) Foreign Application Priority Data
Aug. 30, 2019 (DE) .................... 10 2019 213 136.0

(51) Int. Cl.
*B62J 9/14* (2020.01)
*B62H 5/00* (2006.01)
*B62J 1/08* (2006.01)
*B62K 19/40* (2006.01)

(52) U.S. Cl.
CPC ............. *B62J 9/14* (2020.02); *B62H 5/003* (2013.01); *B62J 1/08* (2013.01); *B62K 19/40* (2013.01)

(58) Field of Classification Search
CPC ....... B62J 9/14; B62J 1/08; B62J 9/12; B62H 5/003; B62H 5/006; B62K 19/40; B62K 21/12
See application file for complete search history.

(56) References Cited

U.S. PATENT DOCUMENTS

| 4,284,290 A | 8/1981 | Ragsdale |
| 5,678,435 A | 10/1997 | Hodson |
| 5,992,192 A | 11/1999 | Tual et al. |

(Continued)

FOREIGN PATENT DOCUMENTS

| CA | 2 891 401 A1 | 5/2014 |
| CN | 103707982 A | 4/2014 |

(Continued)

*Primary Examiner* — Kevin Hurley
*Assistant Examiner* — Marlon A Arce
(74) *Attorney, Agent, or Firm* — Seed IP Law Group LLP

(57) ABSTRACT

The present disclosure relates to a seat post for a bicycle, a moped or the like, comprising a seat post tube, wherein said seat post tube comprises an opening member that is configured to allow a closure element of the seat post to perform a movement, by means of which a region inside the seat post tube can be accessed in order to insert or remove an elongated object, wherein said seat post tube comprises an upper portion and a lower portion opposite the upper portion, said upper portion being configured to be connected to a seat clamping device and/or to a seat, and wherein the closure element is preferably provided in the region of the upper portion. The present disclosure furthermore relates to a frame for a bicycle, a moped or the like, a use of a seat post or frame according to the disclosure, a folding lock, a locking system and a lock/handlebar combination.

20 Claims, 7 Drawing Sheets

(56) References Cited

U.S. PATENT DOCUMENTS

| | | | |
|---|---|---|---|
| 6,036,214 A * | 3/2000 | Ono | B62H 5/005 280/297 |
| 6,063,214 A * | 5/2000 | Fujinaga | C21D 8/0226 148/602 |
| 10,093,369 B2 * | 10/2018 | Hollo | B62H 5/00 |
| 2006/0140801 A1 * | 6/2006 | Hepfner | B62J 1/10 417/572 |
| 2012/0312058 A1 * | 12/2012 | Mendyk | B62H 5/006 70/233 |
| 2014/0290314 A1 * | 10/2014 | Poehlmann | E05B 67/003 70/18 |
| 2015/0145294 A1 * | 5/2015 | Kench, III | B62K 19/36 297/215.13 |
| 2016/0333611 A1 * | 11/2016 | Mabry | B62K 21/16 |
| 2019/0106170 A1 * | 4/2019 | Hagen | E05B 67/003 |
| 2023/0192208 A1 * | 6/2023 | Watson | B62J 45/41 701/49 |

FOREIGN PATENT DOCUMENTS

| | | |
|---|---|---|
| DE | 100059 C | 1/1898 |
| DE | 411621 C | 3/1925 |
| DE | 30 46 810 A1 | 7/1982 |
| DE | 33 30 840 A1 | 3/1985 |
| DE | 90 05 166.1 U1 | 8/1990 |
| DE | 43 36 605 A1 | 5/1995 |
| DE | 200 05 684 U1 | 12/2000 |
| DE | 20 2005 021 748 U1 | 12/2009 |
| DE | 20 2018 004 075 U1 | 10/2018 |
| EP | 0 824 443 B1 | 8/1999 |
| EP | 1 958 760 A2 | 8/2008 |
| JP | 2007-112417 A | 5/2007 |
| NL | 7806670 A | 12/1979 |
| WO | 92/02400 A1 | 2/1992 |
| WO | 94/25330 A1 | 11/1994 |
| WO | 2014/078967 A1 | 5/2014 |

* cited by examiner

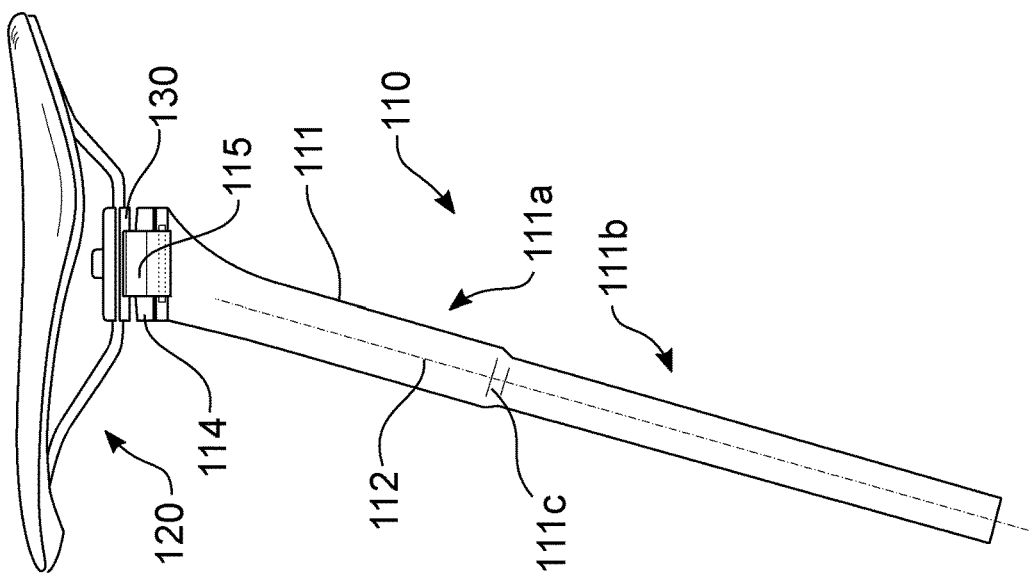
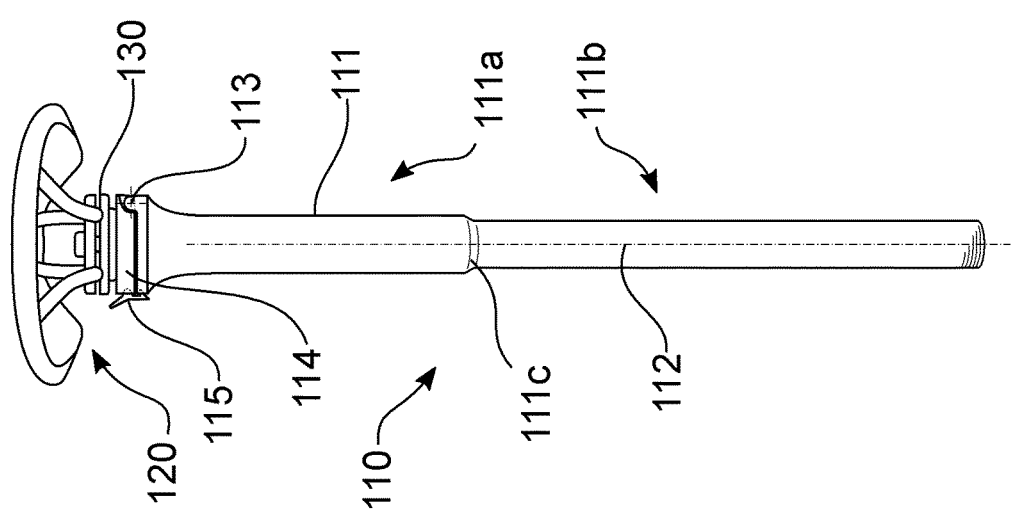
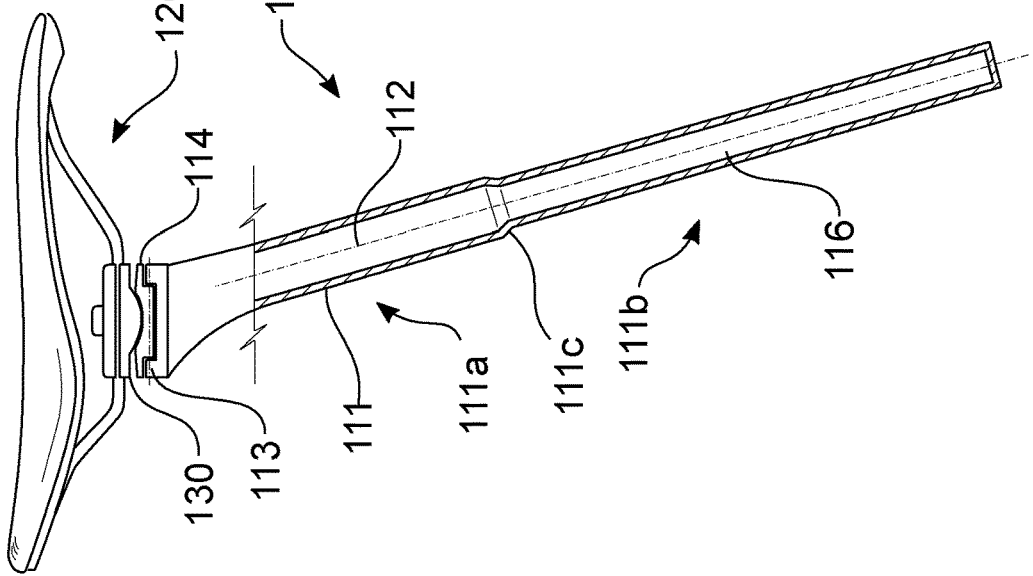

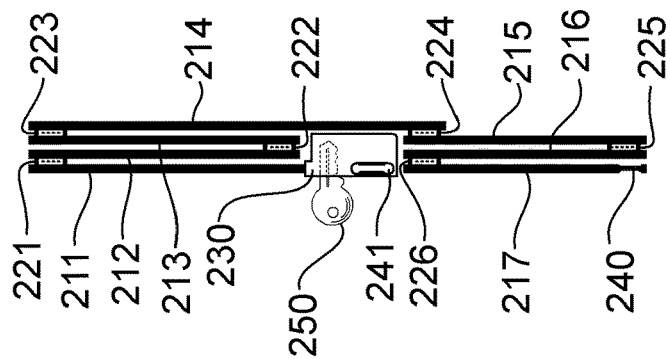
Fig. 4d
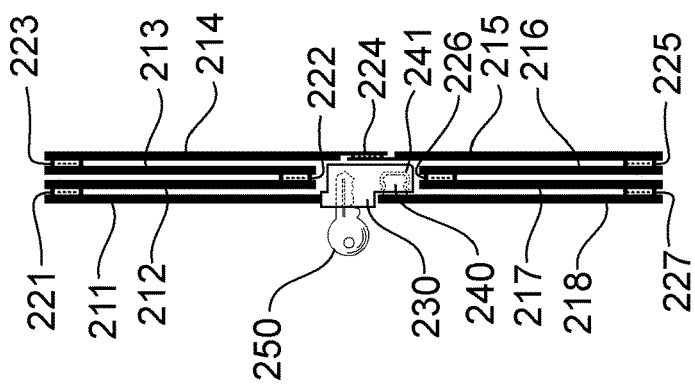
Fig. 4c
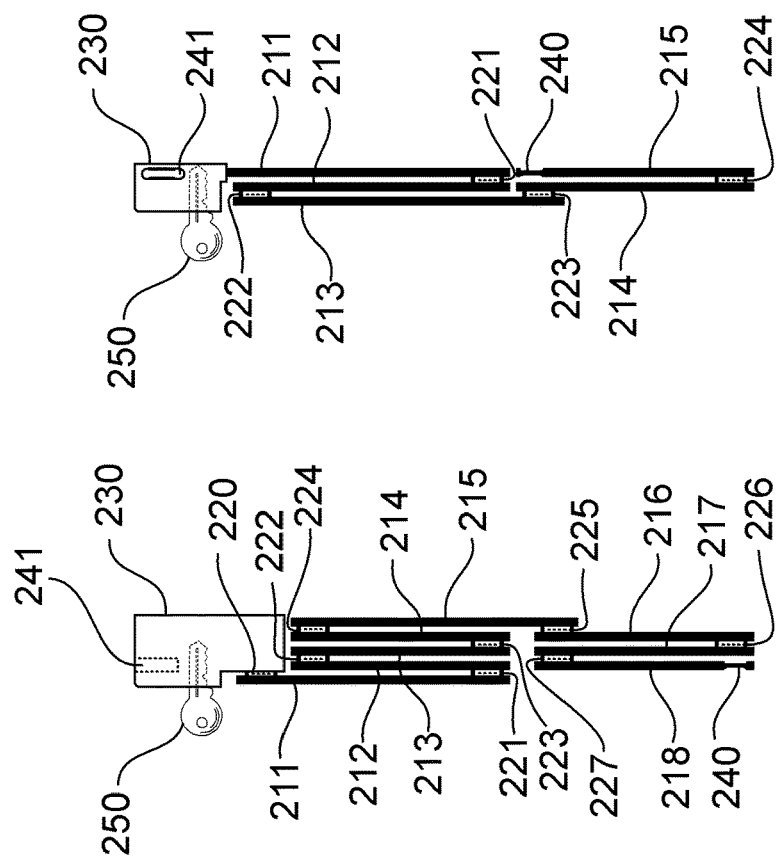
Fig. 4b
Fig. 4a

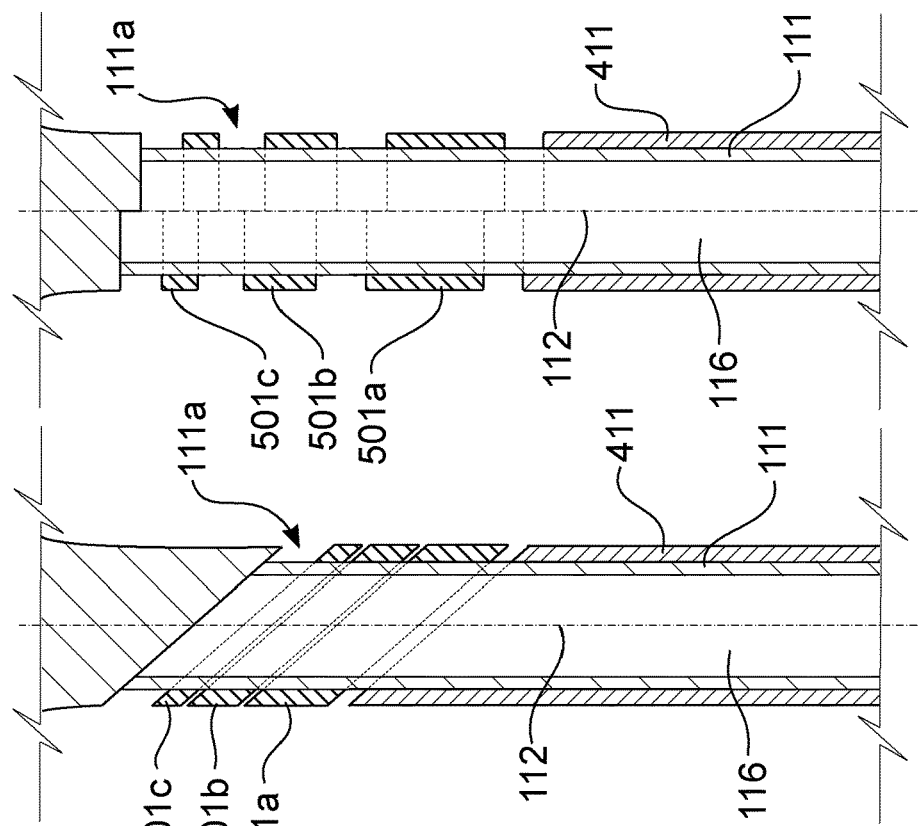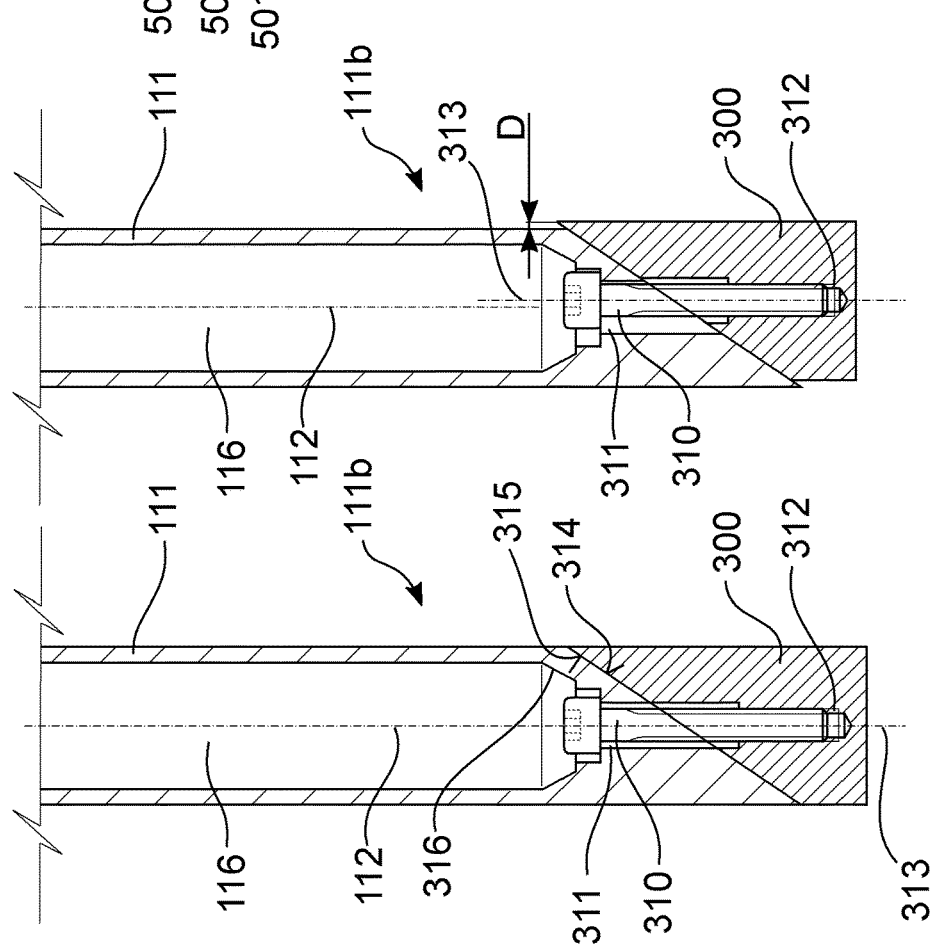

SEAT POST

TECHNICAL FIELD

The present disclosure relates to a seat post and a frame for a bicycle, a moped or the like, as well as the use thereof. The present disclosure furthermore relates to a folding lock, in particular for protection against theft of a bicycle, a moped or the like, as well as to a locking system with a seat post according to the disclosure or a frame according to the disclosure, and with a folding lock according to the disclosure. The present disclosure furthermore relates to a lock/handlebar combination.

PRIOR ART

As is apparent, for example, from WO 94/25330 A1, DE 4336605 A1, DE 3330840 A1, DE 3046810 A1, CA 2891401 A1, NL 7806670 A, U.S. Pat. No. 4,284,290 B, EP 0824443 B1, DE 202018004075 U1, DE 411621 C or WO 92/02400 A1, concepts aimed at storing a bicycle lock in components of a bicycle have been described many times in the past. By means hereof, the bicycle lock should not be visible, at least in parts, when using the bicycle and/or should not be bothersome when using the bicycle. A bicycle lock that cannot be stored as described in the aforementioned documents may, for example, be wrapped around a portion of the bicycle frame for storage. This may have a disruptive impact on the pedalling motion and/or the visual appearance. Furthermore, the surface of the bicycle frame can be damaged by the bicycle lock, for example by scratching the paint.

However, it has also been shown that the concepts known from the prior art for storing a bicycle lock in a bicycle frame (or in components of a bicycle) can have one or more of the disadvantages described below.

For example, even though some of these locks can in part be stored in a seat tube or seat post tube of a bicycle, individual components, such as a locking block, protrude from the seat tube or seat post tube either owing to the installation space or for other technical reasons. In other words, these locks cannot be fully stored in the seat tube or seat post tube and are therefore prone to weathering and/or damage. This partial protrusion can also have a negative impact on the aerodynamics and/or on the visual appearance of the bicycle.

Furthermore, some of the locks known from the prior art are not completely removable from the seat tube or seat post tube. For example, the locks disclosed in DE 3330840 A1, DE 3046810 A1, CA 2891401 A1, NL 7806670 A, U.S. Pat. No. 4,284,290 B or WO 92/02400 A1 remain connected to a predetermined section of the seat tube or seat post tube of the bicycle even during the locking process. This can in turn significantly limit the flexibility in respect of the locking process. The aforementioned locks may then be unsuitable, for example, if a bicycle is to be locked to a fixed bicycle stand (or bicycle holder) that is configured to be locked together with the front wheel of a bicycle.

Furthermore, the bicycle locks known from the aforementioned prior art are cable-, rope- or chain-based locks. However, cable-, rope- or chain-based locks are easier for potential bicycle thieves to break than other types of lock.

The locks of DE 4336605 A1, DE 202018004075 U1 and DE 411621 C have additionally proven to be disadvantageous insofar as they require the entire seat (including the seat post) to be removed from the bicycle frame in order to lock the bicycle. Consequently, when the bicycle lock is to be stored again after use, it may be necessary to readjust the seat height.

As regards the bicycle lock disclosed in DE 202018004075 U1, disadvantages in respect of protection against theft are also apparent in connection with the mass of the lock. Specifically, due to the way they are designed, the elements of this lock have a tapering cross-section in the region of the joints. However, since the smallest cross-section of an element is usually decisive for the anti-theft protection of a bicycle lock of this type, essentially no advantages in terms of anti-theft protection arise from the larger cross-sections of the elements in the other areas. However, it makes the entire bicycle lock heavier. Since the mentioned large cross-sections are necessary for a stable fit of the lock in the seat tube of the bicycle, these cannot just be simply tapered either.

DESCRIPTION OF THE INVENTION

The object forming the basis for the present disclosure is to solve at least one of the problems described above and to provide an improved way of using the free space available in a bicycle, moped or the like.

A seat post according to the present disclosure is defined in claim 1. A frame according to the present disclosure is defined in claim 10. A folding lock according to the present disclosure is defined in claim 14. A lock/handlebar combination according to the present disclosure is defined in claim 17. Preferred embodiments are specified in the sub-claims.

A seat post according to the present disclosure is suitable for a bicycle, a moped or the like. The terms "bicycle" and "moped" are also, but not exclusively, directed at two-wheelers. For example, the term "bicycle" also includes three- or four-wheeled bicycles, such as cargo bikes. The term "moped" also includes three- or four-wheeled vehicles, provided they have a seat. In the present context, a bicycle may furthermore also be a bicycle with a drive, for example with an electric drive. A seat post according to the present disclosure comprises a seat post tube, which in turn comprises an opening member. This opening member is configured to allow a closure element of the seat post to perform a movement, by means of which a region inside the seat post tube can be accessed in order to insert or remove an elongated object. The seat post tube comprises an upper portion and a lower portion opposite the upper portion. The upper portion is configured to be connected to a seat clamping device and/or to a seat. The closure element is preferably provided in the region of the upper portion. It is particularly preferred for the closure element to be configured so as to be connected to a seat clamping device and/or to a seat. The closure element can furthermore be configured to close the seat post tube in a fluid-tight manner. The outer circumferential length of the seat post tube in the region of the lower portion is smaller than the outer circumferential length of the seat post tube in the region of the upper portion. In the case of a seat post tube with a circular cross-section, the outside diameter of the seat post tube in the lower portion is thus smaller than the outside diameter of the seat post tube in the upper portion.

Conventional bicycle frames generally comprise a seat tube into which a seat post tube can be inserted. However, usually only an upper portion of such a seat tube is prepared for insertion of a seat post tube (i.e. provided with a fit, for example). Lower portions of such seat tubes are not normally machined on the inner surface thereof (and are also difficult to machine since this requires very long cutting tools, for example). The inner surface of a lower portion of a seat tube may consequently have a high roughness, zinc bumps or other protrusions that make it difficult to insert a comparatively long seat post tube deep into the seat tube. Furthermore, the inner surface of a lower portion of a seat tube may comprise parts of fastening elements, for example parts of screws, which are provided to attach a bottle holder or the like to an outer surface of the seat tube. These parts of the fastening elements can possibly make the deep insertion of a comparatively long seat post tube more difficult.

The seat post according to the disclosure is therefore advantageous at least insofar as it can have a comparatively long seat post tube and, due to the taper of the seat post tube in the lower portion of the seat post tube, can nevertheless be inserted deeply into a conventional frame. Thus, in a seat post according to the disclosure, a comparatively large space is available inside the seat post tube, which is accessible owing to the opening member and can thus be used for inserting and storing objects.

A further seat post according to the present disclosure comprises a seat post tube, which in turn comprises an opening member. This opening member is configured to allow a closure element of the seat post to perform a movement, by means of which a region inside the seat post tube can be accessed in order to insert or remove an elongated object. The seat post tube comprises an upper portion and a lower portion opposite the upper portion. The upper portion is configured to be connected to a seat clamping device and/or to a seat. The closure element is preferably provided in the region of the upper portion. It is particularly preferred for the closure element to be configured so as to be connected to a seat clamping device and/or to a seat. The closure element can furthermore be configured to close the seat post tube in a fluid-tight manner. The outer circumferential length of the seat post tube in the region of the lower portion is substantially the same as the outer circumferential length of the seat post tube in the region of the upper portion. In the case of a seat post tube with a circular cross-section, the outside diameter of the seat post tube in the lower portion is substantially the same as the outside diameter of the seat post tube in the upper portion.

In a seat post according to the disclosure, the opening member may comprise a hinge, a plug connection, a sliding connection, a clamping connection, parallel kinematics and/or shear kinematics. The opening member may furthermore comprise a centring element and/or an anti-rotation element.

An opening member comprising a hinge is deemed to be particularly advantageous. This can allow a region inside the seat post tube to be accessed in order to insert or remove an object, whilst the opening movement only requires a small amount of space. A hinge is also a comparatively inexpensive opening member with high mechanical strength and low susceptibility to errors.

An opening member with additional centring elements and/or anti-rotation elements may be advantageous, for example, if the centring elements and/or anti-rotation elements guide the forces transmitted to the seat post during riding (owing, for instance, to the weight of a passenger sitting on the seat) in such a manner that the opening member is not subjected to any load or is only subjected to a low load in the closed state.

A seat post according to the disclosure may comprise a fixing member that is configured to fix the closure element in a state in which the region inside the seat post tube is not accessible by an operator. The fixing member may, for example, comprise a clamp lock, a screw lock, a screw sleeve, a snap lock, a bayonet catch, a bolt lock, a slide lock and/or a bayonet catch sleeve.

A snap lock is deemed to be particularly advantageous in terms of user-friendliness. A snap lock may comprise an engagement element connected to the seat tube or closure member with a translational and/or rotational degree of freedom. The engagement element may be a hook, for example. The engagement element may be pre-tensioned by a spring in a first direction. The seat tube or closure member (in particular the one of the two elements that does not comprise the engagement element) may furthermore comprise a recess configured and arranged such that the engagement element can engage with the recess to fix the closure element in a state in which the region inside the seat post tube is not accessible by an operator. The recess may be formed as part of the closure member or as part of the fixing member (in particular the snap lock). The spring element preferably pre-tensions the engagement element in the direction of the recess. A fixing member configured in such a manner can be actuated easily and quickly and has a low susceptibility to error and/or wear.

In a seat post according to the disclosure, the length of the seat post tube (in the axial direction of the tube) may be at least 40 cm, preferably at least 50 cm, and particularly preferred at least 55 cm. The length of the lower portion of the seat post tube in the axial direction may, for example, be at least 10 cm, preferably at least 20 cm and particularly preferred at least 30 cm. Furthermore, the length of the seat post tube may, for example, not be greater than 60 cm and the length of the lower portion may not be greater than 35 cm. The aforementioned lengths are advantageous since they provide as much usable space as possible inside the seat post tube whilst at the same time countering the risk of the seat post tube colliding with other elements (e.g. the bottom bracket, drivetrain or screws for attaching a bottle holder) of the bicycle, moped, or the like.

In a seat post according to the disclosure, the outer circumferential length of the seat post tube in the lower portion may deviate from the diameter of the seat post tube in the upper portion by a value of between 1 mm and 15 mm inclusive, preferably between 2 mm and 10 mm inclusive, and particularly preferred between 2.5 mm and 9 mm inclusive. The aforementioned values can be understood as the solution to a two-dimensional optimisation problem, which solution arises on the one hand from the efforts to prevent, as far as possible, collisions with any contours on the inner surface of the seat tube in a lower region of the seat tube, and on the other hand from the efforts to maximise the usable volume inside the seat post tube as far as possible.

The seat post tube may have substantially the same inside diameter along its entire length. In this case, the wall thickness may be tapered in the lower portion of the seat post tube. However, the seat post tube may also have a smaller inside diameter in the region of the lower portion than in the region of the upper portion. In this case, the wall thickness of the seat post tube may be substantially constant over its entire length.

In a seat post according to the disclosure, the lower portion of the seat post tube may comprise a first axis relative to which it is rotationally symmetrical, and the upper portion of the seat post tube may comprise a second axis relative to which it is rotationally symmetrical. The first axis may substantially extend shifted parallel to the second axis. The distance between the first axis and the second axis may, for example, be between 0.5 mm and 2.5 mm. Alternatively or additionally, the lower portion of the seat post tube may comprise a recess extending in the axial direction in the region of an outer circumferential surface.

The aforementioned measures make it possible to selectively take into consideration interference contours on the inner surface of the seat tube that are not uniformly distributed in the circumferential direction over the inner surface of the seat tube in the lower portion of the seat tube (e.g. screws of a bottle holder).

In the case of a seat post according to the disclosure, the seat post tube may comprise a spring element, preferably a compression spring element provided in the lower portion of the seat post tube, which is configured to pre-tension an object that can be inserted into the region inside the seat post in the direction of the closure element. A removal process of this object can be supported in this manner.

In the case of a seat post according to the disclosure, the seat post tube may comprise a clamping element in the region of the lower portion, which is connected to the seat post tube by a fastening element, preferably by a screw. The clamping element may be configured such that actuation of the fastening element (for example tightening of the screw) results in displacement of the clamping element, the direction of displacement being at least partially radial to the axis of the seat post tube. For this purpose, the seat post tube may, for example, be configured in a slanted manner at one end of the lower portion relative to the axis of the seat post tube. The clamping element may have a corresponding slanted design. If a screw is used as the fastening element, it may extend substantially parallel to the axis of the seat post tube. The end of the lower portion may comprise a through-hole for the fastening element (in particular for the screw). This through-hole may have a diameter that allows the screw to be displaced radially relative to the axis of the through-hole.

The above-described clamping element may be used to fix a seat post according to the disclosure at a certain height in the frame of a bicycle. The fastening element (e.g. the screw) may, for instance, be actuated (e.g. tightened or loosened) with a disproportionately long tool (e.g. an extra-long Allen key or Torx key). Starting from the opened upper portion of the seat post tube, the disproportionately long tool can be guided for this purpose into the region inside the seat post tube towards the fastening element (e.g. the screw). The need for such a disproportionately long special tool can be associated with increased anti-theft protection of the seat post. The possibility of inserting such a special tool into the seat post furthermore also only arises from the fact that a seat post according to the disclosure comprises an opening member.

Owing to the fact that the clamping element is arranged inwardly with respect to the seat post tube, a slimmer visual impression and/or improved aerodynamics can be achieved than with known, external clamping elements.

To additionally support the seat post, sleeves can be slid onto the seat post tube, which can be supported on the seat tube of the bicycle and on a projection of the seat post (or also on each other). The projection of the seat post is preferably formed in the region of the upper portion. A serial succession of sleeves of different lengths can enable an individual adjustment of the seat height. The sleeves may comprise end faces that are slanted or stepped relative to a sleeve axis. The end face of the seat tube and the projection of the seat post may be configured in a corresponding manner. Improved anti-rotation of the seat in addition to the additional support effect can be achieved in this manner.

A frame according to the disclosure is suitable for a bicycle, a moped or the like. The frame comprises a seat tube that is connected to the frame by means of a material fit. The seat tube comprises an upper portion and a lower portion opposite the upper portion. In the region of the upper portion, the seat tube is connected via a hinge to a closure element that is configured to be connected to a seat clamping device and/or to a seat. The closure element is configured to be brought into an open position in which a region inside the seat tube is substantially accessible by an operator. The closure element is furthermore configured to be brought into a closed position in which the region inside the seat tube is substantially not accessible by an operator. The region inside the seat tube is preferably closed in a fluid-tight manner when the closure element is in the closed position.

A frame according to the disclosure may in particular be used in bicycles that do not have a seat post tube (for example for weight reasons). In order to connect the frame to a seat or a seat clamping device, an intermediate piece (integrated seat mast topper) may, for example, be used. This intermediate piece may be configured, for example, as a sleeve that is slidable in the axial direction over the outer circumference of the seat tube of the frame and that can be fixed to the seat tube by means, for example, of a clamping and/or screw connection. The intermediate piece preferably comprises the hinge that is connected to the closure element. The intermediate piece is furthermore preferably configured such that a position of the seat clamping device or the seat can be changed relative to the axial direction of the seat tube. It is possible to adjust the height of a seat in this manner, even in the absence of a seat post tube. A frame according to the disclosure may furthermore comprise a fixing member that is configured to fix the closure element in a state in which the region inside the seat post tube is substantially not accessible by an operator. The fixing member may, for example, comprise a clamp lock, a screw lock, a screw sleeve, a snap lock, a bayonet catch, a bolt lock, a slide lock and/or a bayonet catch sleeve.

A frame according to the disclosure may be associated with substantially the same or comparable advantages as a seat post according to the disclosure.

A seat post according to the disclosure or a frame according to the disclosure may be used, for example, to store a lighting device, a puncture kit, an air pump, a charger or an energy storage device, preferably a charger or an energy storage device for an electrically-operated shift device and/or an electric drive, in the region inside the seat post tube or the seat tube. The aforementioned elements are optionally elements which, in the absence of a seat post or frame according to the disclosure, must be transported in other transport devices (for example a bicycle bag or backpack) (e.g. charger), or that are otherwise mounted at positions on the frame where they may be exposed to the elements (e.g. air pump, puncture kit, energy storage device, drive). The above-described use can thus be associated with an increased reliability and/or service life of the respective components, and/or with an improvement in operating comfort (e.g. by eliminating the need for a backpack).

The present disclosure furthermore relates to a folding lock, in particular for protection against theft of a bicycle, a moped or the like, comprising a lock body and n link segments of a substantially flat design. In this case, n is an integer greater than or equal to 3. n is preferably an integer greater than or equal to 4. Particularly preferred: n=5, n=6, n=7, n=8, n=9 or n=10. Each link segment has a thickness d. All link segments of the folding lock preferably have substantially the same thickness d. The direction of thickness is defined as the direction of least extension of a link segment. The link segments are preferably arranged such that the direction of thickness of each link segment is substantially the same direction. In the present case, the direction of thickness of the link segments defines a common direction of thickness of the lock. A first, end link segment is connected to the lock body. A second link segment is pivotably connected to the first link segment via a hinge pin. A third link segment is pivotably connected to the second link segment via a hinge pin. A final, end link segment comprises a locking element that is configured to be locked together with a correspondingly configured counterpart in the lock body. Each hinge pin preferably allows only one rotation of the link segments connected thereto about an axis. It is particularly preferred for the axes of all joints (or hinge pins) to be parallel. The extension of the entire folding lock in the direction of thickness is no more than $(n/2+1)*d*1.1$. Owing to the factor 1.1, in particular clearances of hinge pins can be taken into consideration. However, the expansion of the entire folding lock in the direction of thickness can also be no more than $(n/2+1)*d$. It is further preferred that $(n/2+1)*d<31.6$ mm, $(n/2+1)*d<30.9$ mm, $(n/2+1)*d<27.2$ mm, or $(n/2+1)*d<25.4$ mm.

Due to its proportions, a folding lock according to the disclosure is particularly suitable for storage in a seat post or in a frame according to the present disclosure.

It is apparent from the aforementioned provision regarding the extension of the entire folding lock in the direction of thickness that at least two link segments of the folding lock can be arranged adjacent to one another relative to the longitudinal direction of the link segments. The longitudinal direction of a link segment relates to the largest extension of a link segment. The lock is preferably configured to assume a storage state in which the longitudinal directions of all link segments have substantially the same orientation. The folding lock is particularly preferably configured to assume a storage state in which the longitudinal directions of all link segments have substantially the same orientation and at least two, but in each case preferably no more than two link segments are arranged adjacent to one another in the longitudinal direction of the link segments.

The feature "two and in each case no more than two link segments are arranged adjacent to one another in the longitudinal direction" preferably relates to a state in which these link segments do not overlap in the longitudinal direction. The feature "two and in each case no more than two link segments are arranged adjacent to one another in the longitudinal direction" furthermore particularly preferably relates to a state in which a first top side of a first of the two and in each case no more than two link segments lies substantially in the same plane as a first top side of a second of the two and in each case no more than two link segments, and in which a second top side of the first of the two and in each case no more than two link segments lies substantially in the same plane as a second top side of the second of the two and in each case no more than two link segments. The top sides of the link segments are sides oriented perpendicular to the direction of thickness of the link segments. The top sides of all link segments of the folding lock are preferably configured flat. Furthermore, the two and in each case no more than two link segments arranged adjacent to one another in the longitudinal direction are preferably arranged such that the longitudinal directions of the link segments are oriented in parallel and coincide.

So that the link segments of the folding lock can be arranged adjacent to one another relative to the longitudinal direction in the storage state described above, the third link segment can, for example, be shorter or longer than the second link segment (in each case relative to the longitudinal direction).

A folding lock according to the disclosure preferably furthermore comprises at least one lateral link segment connected in a hinged manner to two further link segments of the folding lock, the two further link segments being arranged on the same side of the lateral link segment relative to the direction of thickness.

A folding lock according to the disclosure may have an unfolded length which is greater by a multiple, for example by at least a factor of two, three, four or five, than a folded length (length in the stored state, in each case relative to the longitudinal direction). In this manner, a folding lock according to the disclosure may be suitable for locking a bicycle (or the like) to a fixed object with a large outer circumference (e.g. to a tree). For example, a folding lock according to the disclosure may have an unfolded length greater than or equal to 110 cm, greater than or equal to 120 cm, or greater than or equal to 130 cm. Furthermore, a folding lock according to the disclosure may have a folded length that is less than or equal to 55 cm, less than or equal to 50 cm, less than or equal to 45 cm, less than or equal to 40 cm, less than or equal to 35 cm, less than or equal to 30 cm, or less than or equal to 25 cm.

Selected link segments or all link segments of the folding lock preferably do not have a greater thickness in any section than in the region of the joint or joints (hinge pins). It is particularly preferred for the thickness of all link segments to be substantially constant over the entire length thereof. In this manner, an optimised weight can be achieved whilst maintaining a high level of anti-theft protection of the folding lock.

A folding lock according to the disclosure can be configured such that it can be locked and/or unlocked by operating a key, by entering a code (for example a number), by recognition of a biometric feature (for example an iris or retina of an eye, a fingerprint or a voice), by operating an external device (for example a network-based mobile terminal, in particular a smartphone or tablet) and/or by a transponder (for example with an RFID chip or with an NFC chip).

Furthermore, in a folding lock according to the disclosure, at least two link segments can each comprise a catch element, the catch elements being arranged and are such that the at least two link segments can adopt a preferred orientation in which the at least two link segments are oriented substantially parallel relative to the longitudinal direction thereof. Preferably at least half of the link segments each comprise at least one of the catch elements described above. Particularly preferably all of the link segments of the folding lock each comprise at least one of the catch elements described above. The catch elements may, for example, comprise ball catch elements and/or permanent magnets.

The catch elements can allow a user to hold the folding lock at a first end without individual pairs of links folding away due to gravity. This can in particular be advantageous if the folding lock according to the disclosure is to be inserted into a seat post according to the disclosure (in particular into the region inside the seat post tube) or into a frame according to the disclosure (in particular the region inside the seat tube).

A locking system according to the disclosure comprises a seat post or frame according to the disclosure and a folding lock according to the disclosure. The folding lock of a locking system according to the disclosure can be configured such that the lock body of the folding lock can be locked together with the seat post. In this manner, the folding lock can be protected against theft and vandalism even when in the stored state.

The folding lock of a locking system according to the disclosure can furthermore be configured such that at least two externally arranged link segments each have a chamfer and/or rounded edge on two sides. The chamfer and/or rounded edge is preferably matched to the inner contour of the seat post tube of the seat post or the seat tube of the frame. Alternatively or additionally, the inside of the seat post tube of the seat post or the inside of the seat tube of the frame may comprise at least one guide member that is configured to guide link segments of the folding lock during insertion of the link segments into the region inside the seat post tube or the seat tube. The at least one guide member is furthermore preferably configured to substantially prevent movement of the link segments in a direction perpendicular to a central axis of the seat post tube or the seat tube. The chamfer, rounded edge and/or guide member can facilitate insertion of the folding lock into the region inside the seat post tube or the seat tube. Noise generation when riding (for example due to a wobbling folding lock) can furthermore be countered. The guide member is preferably made of a plastic, in particular of a chemically or physically foamed plastic, such as EPS, EPP or the like. Alternatively or additionally, the interior circumferential surface of the seat post tube of the seat post or the seat tube of the frame may be provided with a lacquer or coating. The inner circumferential surface of the seat post tube of the seat post or the seat tube of the frame is preferably provided with a layer of PUR, POM, PE, PP, TPE, TPU, SEBS and/or silicone.

A lock/handlebar combination according to the disclosure comprises a handlebar for a bicycle, moped or the like, and a lock for preventing theft of a bicycle, moped or the like. The lock of the lock/handlebar combination is preferably a folding lock according to the disclosure. The handlebar comprises an interior space with a free cross-section. The interior space is accessible at least from a first end portion of the handlebar. The interior space of the handlebar is furthermore configured to accommodate the lock.

The lock of the lock/handlebar combination may comprise a lock body that forms an end portion of the lock and is configured to be locked together with a locking element. The lock body can be configured for operation of a key, for entry of a code (for example a number), for recognition of a biometric feature (for example an iris or retina of an eye, a fingerprint or a voice), for operation by an external device (for example a network-based mobile terminal, in particular a smartphone or tablet) and/or for interaction with a transponder (for example with an RFID chip or with an NFC chip).

The lock body preferably comprises a cover member that is configured such that the first end portion of the handlebar is closed in a fluid-tight manner following insertion of the lock into the interior space of the handlebar. It is particularly preferred for the lock body to be configured to be locked together with both a locking element of the lock as well as with the handlebar. In this manner, the lock can be protected against theft and vandalism even when in the stored state.

In a lock/handlebar combination according to the disclosure, the handlebar may comprise a tube having a tube axis extending substantially centrally therein. Relative to the tube axis, this tube preferably has exclusively radii of curvature that are, for example, greater than 28 mm, greater than 35 mm, greater than 60 mm, greater than 80 mm, greater than 100 mm, greater than 120 mm, greater than 200 mm, greater than 400 mm, greater than 500 mm, or greater than 800 mm. It is particularly preferred for the amount of the free cross-section perpendicular to the tube axis inside the tube to be indirectly proportional to the radius of curvature of the tube.

The aforementioned radii of curvature and/or the relationship between the radius of curvature and the free cross-section can make it possible to also insert locks with long link segments (for example a lock in which all the link segments are at least 100 mm, 150 mm or 200 mm long) into the interior space of the handlebar.

A seat post or frame according to the disclosure may be used as a component of a bicycle, moped or the like. The frame of the bicycle or the frame according to the disclosure may furthermore comprise a top tube and/or a down tube. Together with the seat post tube of the seat post or with the seat tube of the frame, the top tube and/or down tube spans a hypothetical plane of the frame. In one use according to the disclosure, the opening member or hinge may be configured to tilt the closure element about a hinge axis that extends substantially parallel to the plane of the frame and particularly preferably extends at a distance parallel to the plane of the frame. The hinge axis may furthermore extend substantially horizontally.

Also disclosed is a combination of a seat post according to the disclosure and a seat, or of a frame according to the disclosure and a seat. The seat is thereby configured to be substantially symmetrical relative to a plane of symmetry. The opening member may be a hinge with a hinge axis. The hinge may be configured to tilt the closure element about a hinge axis that extends substantially parallel to the plane of symmetry, and preferably extends at a distance parallel to the plane of the frame.

The use and/or combination described above may allow a user to tilt the seat of a bicycle (relative to a forward direction of travel of the bicycle) to one side (i.e. to the right and/or the left). The hinge may in particular be configured in such a manner that tilting (i.e. an opening movement) towards both sides is possible. Tilting the seat to one side can be associated with improved accessibility of the region inside the seat post tube or the seat tube (especially as compared to tilting forward or backward).

BRIEF DESCRIPTION OF THE FIGURES

FIG. 1a shows an embodiment of a seat post according to the disclosure in a first side view;

FIG. 1b shows the embodiment of a seat post according to the disclosure from FIG. 1a in a rear view;

FIG. 1c shows the embodiment of a seat post according to the disclosure from FIG. 1a in a second side view;

FIG. 4a shows a further embodiment of a folding lock according to the disclosure in a front view;

FIG. 4b shows a further embodiment of a folding lock according to the disclosure in a front view;

FIG. 4c shows a further embodiment of a folding lock according to the disclosure in a front view;

FIG. 4d shows a further embodiment of a folding lock according to the disclosure in a front view;

FIG. 5a shows a sectional view of an embodiment of a locking system according to the disclosure along line A-A from FIG. 3a;

FIG. 5b shows a sectional view of a further embodiment of a locking system according to the disclosure along line A-A from FIG. 3a;

FIG. 6a shows a sectional view of a lower portion of an embodiment of a seat post according to the disclosure in a first state;

FIG. 6b shows a sectional view of the lower portion of the embodiment of a seat post according to the disclosure from FIG. 6a in a second state;

FIG. 7a shows a sectional view of the upper portion of an embodiment of a seat post according to the disclosure;

FIG. 7b shows a sectional view of the upper portion of an embodiment of a seat post according to the disclosure;

DETAILED DESCRIPTION OF PREFERRED EMBODIMENTS

The preferred embodiments of the present invention described below are merely examples and should not be seen as limiting. Identical reference numbers specified in different figures designate identical, corresponding or functionally similar elements.

Figure 2:
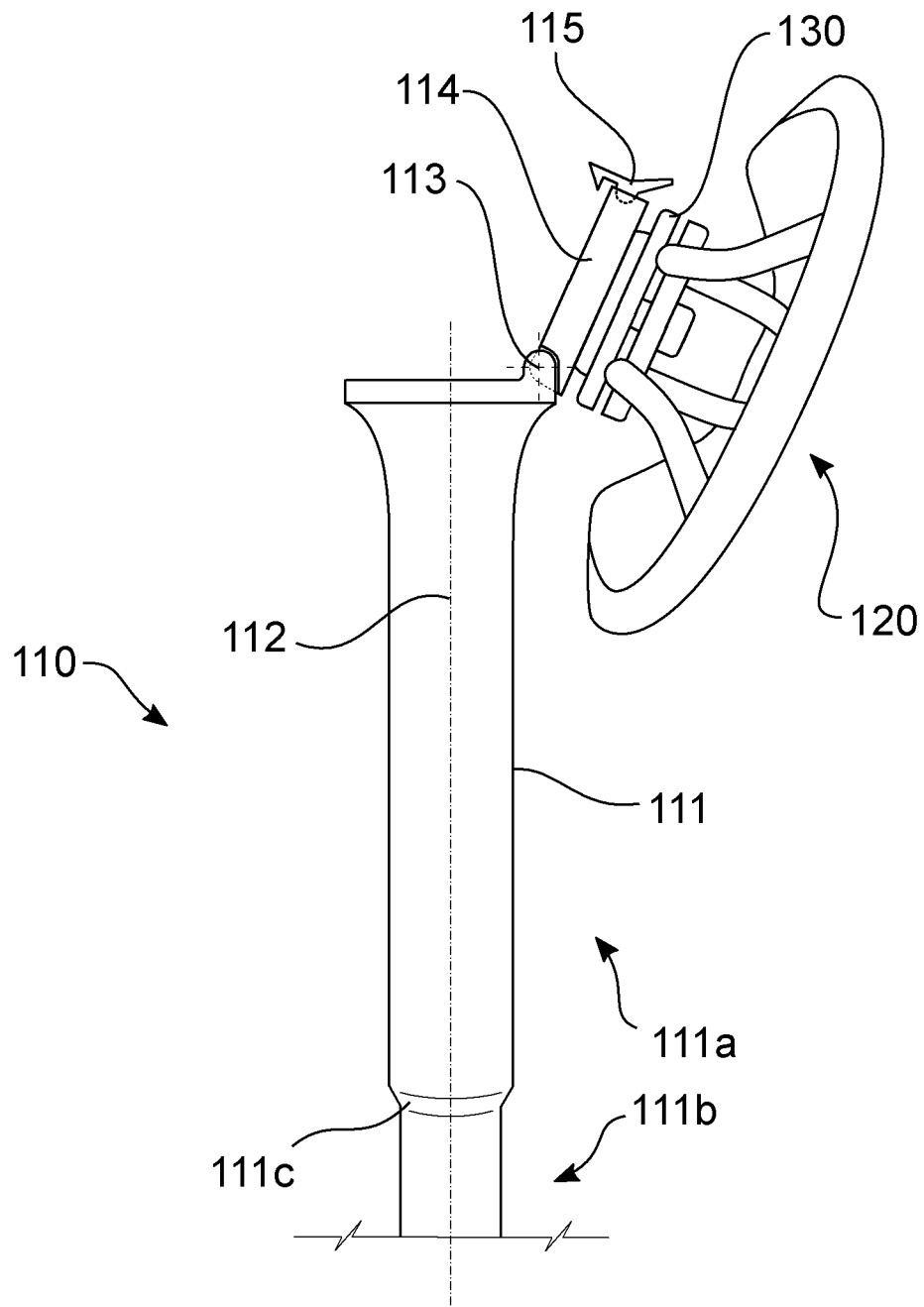
FIG. 2 shows a rear view of the embodiment of a seat post according to the disclosure from FIG. 1a in an open state.

FIGS. 1a, 1b and 1c show an embodiment of a seat post 110 according to the disclosure comprising a seat post tube 111. The seat post 110 comprises a hinge 113 that is configured to allow a closure element 114 to perform a movement, by means of which a region 116 inside the seat post tube 111 can be accessed in order to insert or remove an elongated object. In the shown embodiment, the closure element 114 is a lid. The seat post tube 111 is shown in half-section in FIG. 1a. As a result, the region 116 inside the seat post tube 111 is visible in FIG. 1a. The seat post tube 111 comprises an upper portion 111a and a lower portion 111b opposite the upper portion. A transition portion 111c is formed between the upper portion 111a and the lower portion 111b. The lid 114 formed in the region of the upper portion 111a is connected to a seat clamping device 130, to which a seat 120 is in turn attached. The seat clamping device 130 is configured such that the inclination of the seat 120 can be adjusted. The outer circumferential length of the seat post tube 111 in the region of the lower portion 111b is smaller than the outer circumferential length of the seat post tube 111 in the region of the upper portion 111a. The transition portion 111c is formed as a conical taper. In one variant of the first embodiment, the seat post tube 111 is rotationally symmetrical at least in parts, but preferably uniformly transitions into a substantially square cross-section at an end portion of the upper portion 111a. The hinge 113 is disposed in the region of the end portion of upper portion 111a. A circumferential contour with a seal may be formed on an end face of the end portion of the upper portion 111a. The seat post 110 furthermore comprises a snap lock 115 configured to fix the lid 114 in a state in which the region 116 inside the seat post tube 111 is not accessible by an operator. The snap lock 115 comprises a hook connected to the lid 114 with a rotational degree of freedom. The hook comprises a spring element, by means of which it is pre-tensioned in a first direction (in a counter-clockwise direction in the example of FIG. 1b or FIG. 2). In the region of the end portion of the upper portion 111a, the seat tube 111 comprises a recess that is configured and arranged in such a manner that the hook of the snap lock 115 can engage in the recess. This allows the lid 114 to be fixed in a state in which the region 116 inside the seat post tube 111 is not accessible by an operator. FIG. 2 shows a rear view of the embodiment of a seat post according to the disclosure from FIG. 1a, FIG. 1b and FIG. 1c in an open state. The seat post tube 111 of the embodiment of the seat post 110 shown in FIGS. 1a, 1b, 1c and 2 may be closed at its lower side (i.e. at an end portion of the lower portion 111b).

Figures 3A, 3B:
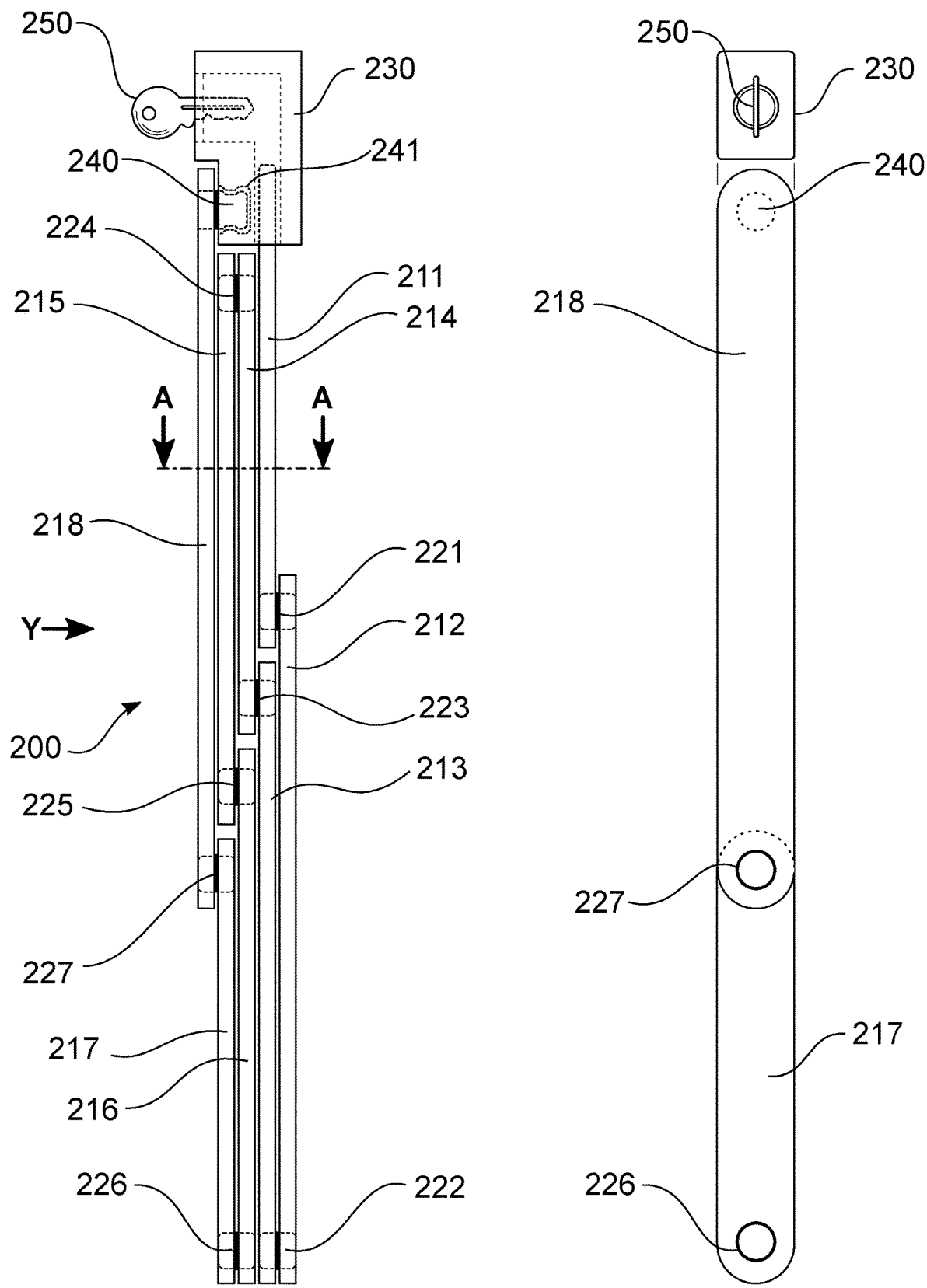
FIG. 3a shows an embodiment of a folding lock according to the disclosure in a front view.
FIG. 3b shows the embodiment of a folding lock according to the disclosure from FIG. 3a in a side view.

FIGS. 3a and 3b show an embodiment of a folding lock 200 according to the disclosure in a front view (FIG. 3a) and in a side view (FIG. 5b), respectively. The side view of FIG. 3b corresponds to a view in the direction of arrow Y in FIG. 3a. The folding lock 200 according to the shown embodiment comprises a lock body 230 and eight substantially flat link segments 211, 212, 213, 214, 215, 216, 217, 218. Each of the link segments 211, 212, 213, 214, 215, 216, 217, 218 has substantially the same constant thickness d. The direction of thickness is defined as the direction of least extension of each link. In the example of FIG. 3a, the arrow Y points in the direction of thickness of the links. A first, end link segment 211 is connected to the lock body. A second link segment 212 is pivotably connected to the first link segment 211 via a first hinge pin 221. A third link segment 213 is pivotably connected to the second link segment 212 via a second hinge pin 222. A fourth link segment 214 is pivotably connected to the third link segment 213 via a third hinge pin 223. A fifth link segment 215 is pivotably connected to the fourth link segment 214 via a fourth hinge pin 224. A sixth link segment 216 is pivotably connected to the fifth link segment 215 via a fifth hinge pin 225. A seventh link segment 217 is pivotably connected to the sixth link segment 216 via a sixth hinge pin 226. An eighth link segment 218 is pivotably connected to the seventh link segment 217 via a seventh hinge pin 227. The eighth link segment 218 is configured as an end link segment and comprises a locking element 240. This locking element 240 is configured to be locked together with a correspondingly configured locking element counterpart 241 in the lock body 230. The extension of the entire folding lock 200 in the direction of thickness is no greater than 5.5*d.

FIGS. 3a and 3b show a storage state of the folding lock 200, in which the longitudinal directions of all link segments 211, 212, 213, 214, 215, 216, 217 have substantially the same orientation, with no more than two link segments 211, 213; 214, 216; 215, 217 being arranged adjacent to one another in the longitudinal direction of the link segments. The longitudinal direction of a link segment relates to the largest extension of a link segment. In FIGS. 3a and 3b, the longitudinal direction is the vertical direction (the direction lying in the sheet plane and perpendicular to the direction Y). The respectively adjacent link segments 211, 213; 214, 216; 215, 217 do not overlap in the longitudinal direction. The link segments 211, 213; 214, 216; 215, 217 that are arranged adjacent to one another in the longitudinal direction are furthermore arranged such that the longitudinal directions of the link segments are oriented in parallel and coincide. So that the link segments 211, 212, 213, 214, 215, 216, 217, 218 of the folding lock 200 can be arranged adjacent to one another relative to the longitudinal direction in the shown storage state, the third link segment 213 is shorter than the second link segment 212 (in each case relative to the longitudinal direction). The sixth link segment 216 is shorter than the third link segment 213. The seventh link segment 217 is shorter than the sixth link segment 216. The fourth link segment 214 is longer than the first link segment 211. The fifth link segment 215 is longer than the fourth link segment 214. The eighth link segment 218 is longer than the fifth link segment 215. The folding lock 200 can be locked with a key 250. However, the key 250 is to be understood symbolically. The folding lock can equally be locked by a code, a biometric feature or the like.

Further embodiments of the locks according to the disclosure are shown in FIGS. 4a, 4b, 4c and 4d. As is apparent from FIG. 4*a*, a first link segment 211 may also be connected in a hinged manner to a lock body 230 by means of a hinge pin 220. As shown in FIG. 4*a*, FIG. 4*b*, and FIG. 4*d*, a locking element 240 may be a taper in a link segment, in which a locking element counterpart 241 can engage for the purpose of locking. As shown in FIG. 4*b* and FIG. 4*d*, a locking element counterpart may be formed on the side of the lock body. As shown in FIG. 4*c* and FIG. 4*d*, a lock body 230 may be arranged to be substantially central when the lock 200 is in the stored state.

Figure 5A:
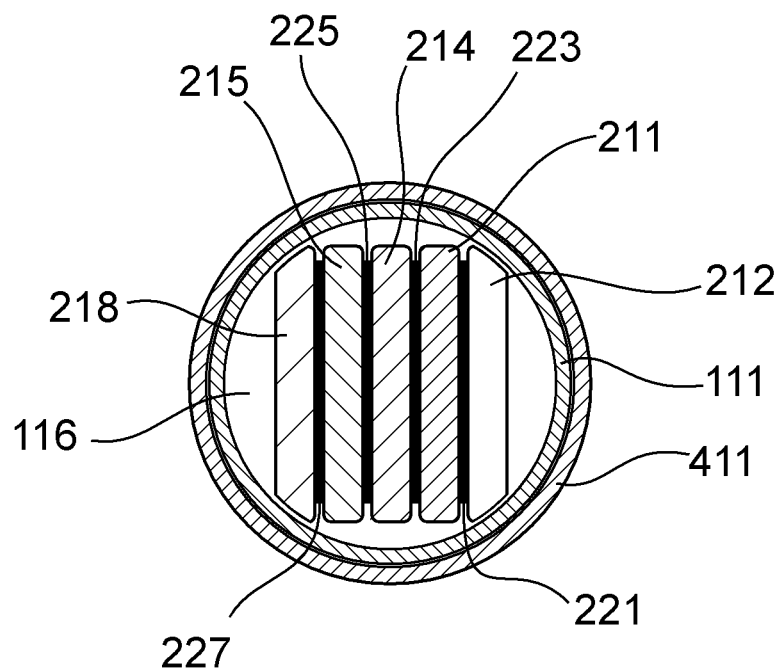
Figure 5B:
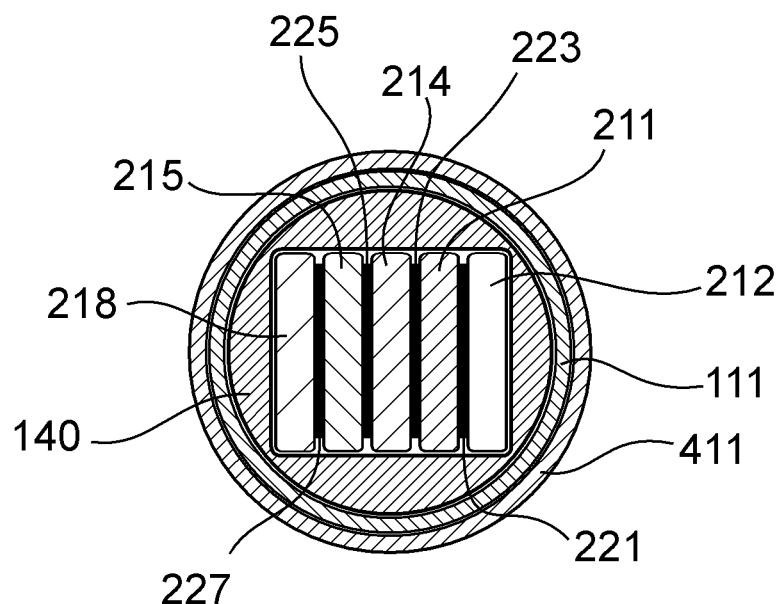

FIG. 5*a* shows a sectional view of an embodiment of a locking system according to the disclosure. The locking system according to the disclosure comprises a folding lock according to the disclosure and a seat post according to the disclosure. The folding lock is the folding lock of FIG. 3*a* and FIG. 3*b*, but the link segments 218 and 212 are each provided with radii or chamfers at two edges. In this manner, the folding lock can be guided inside the seat post tube 111 of the seat post 110 during insertion into the region 116. The lock body 230 preferably comprises correspondingly formed chamfers or radii. In the shown embodiment, the seat post 110 is disposed in a seat tube 411 of a frame. FIG. 5*b* also shows a sectional view of an embodiment of a locking system according to the disclosure. In the embodiment shown in FIG. 5*b*, the region 116 inside the seat post tube 111 furthermore comprises a guide member 140 that is configured to correspond to the outer contour of the folding lock.

FIG. 6*a* shows a sectional view of a lower portion 111*b* of an embodiment of a seat post 110 according to the disclosure in a first state. The first state is a state in which the seat post tube is suitable for being inserted into a seat tube of a frame. In the first state, the seat post 110 is furthermore suitable for adjusting a height of a seat 140. The shown seat post 110 comprises a clamping element 300 at a lower end portion of the lower portion 111*b*, which is connected to the seat post tube 111 by a screw 310. The screw 310 has a screw axis 313, relative to which the screw 310 is substantially rotationally symmetrical. The screw 310 is arranged such that tightening the screw 310 results in a displacement of the clamping element 310, the direction of displacement being at least partially radial to the axis 112 of the seat post tube 111. An end surface 315 at the end portion of the lower portion 111*b* of the seat post tube 111 is configured to be slanted relative to the axis 112 of the seat post tube 111. The clamping element 300 has a correspondingly slanted surface 314. The axis 313 of the screw 310 extends substantially parallel to the axis 112 of the seat post tube 111. The end portion of the lower portion 111*b* comprises a through-hole 311 for the screw 310. This through-hole 311 has a diameter that allows the screw 310 to be displaced radially relative to the axis 112. The screw 310 is essentially not tightened. FIG. 6*b* shows a sectional view of the lower portion 111*b* of the embodiment of a seat post 110 according to the disclosure from FIG. 6*a* in a second state. The second state is a condition suitable for fixing the seat post 110 in a seat tube of a frame. The second state differs from the first state in that the screw 310 is tightened. As a result, the axis 313 of the screw 310 and the clamping element 300 are radially displaced relative to the axis 112 of the seat post tube 111. The displacement primarily results from the slant of surfaces 314, 315.

FIG. 7*a* shows a sectional view of the upper portion 111*a* of an embodiment of a seat post 110 according to the disclosure. The seat post 110 of this embodiment comprises sleeves 501*a*, 501*b*, 501*c*. The sleeves 501*a*, 501*b*, 501*c* are slidable over the outer circumference of the seat post tube 111. The sleeves 501*a*, 501*b*, 501*c* can furthermore be supported on the seat tube 411 of a frame and on a projection of the seat post 110 in the region of an upper end portion of the upper portion 111*a* of the seat post tube 111. The sleeves 501*a*, 501*b*, 501*c* can furthermore be supported on one another. For purposes of illustration, the sleeves in FIG. 7*a* are shown spaced apart from one another and spaced apart from the seat tube 411 and the projection. However, when in use, the sleeves 501*a*, 501*b*, 501*c* rest on one another (and on the seat tube 411 or the projection, respectively). To improve anti-rotation of the seat post 110, the end faces of the sleeves 501*a*, 501*b*, 501*c* are oriented in a slanted manner relative to the sleeve axis (or relative to the axis 112 of the seat tube 111). The end face of the seat tube 411 and the projection of the seat post are configured in a corresponding manner. The embodiment of FIG. 7*b* substantially corresponds to the embodiment of FIG. 7*a*. However, the sleeves (and the projection and end face of the seat tube 411) are stepped rather than slanted. Anti-rotation of the seat post 110 can also be improved in this manner.

Figure 8:
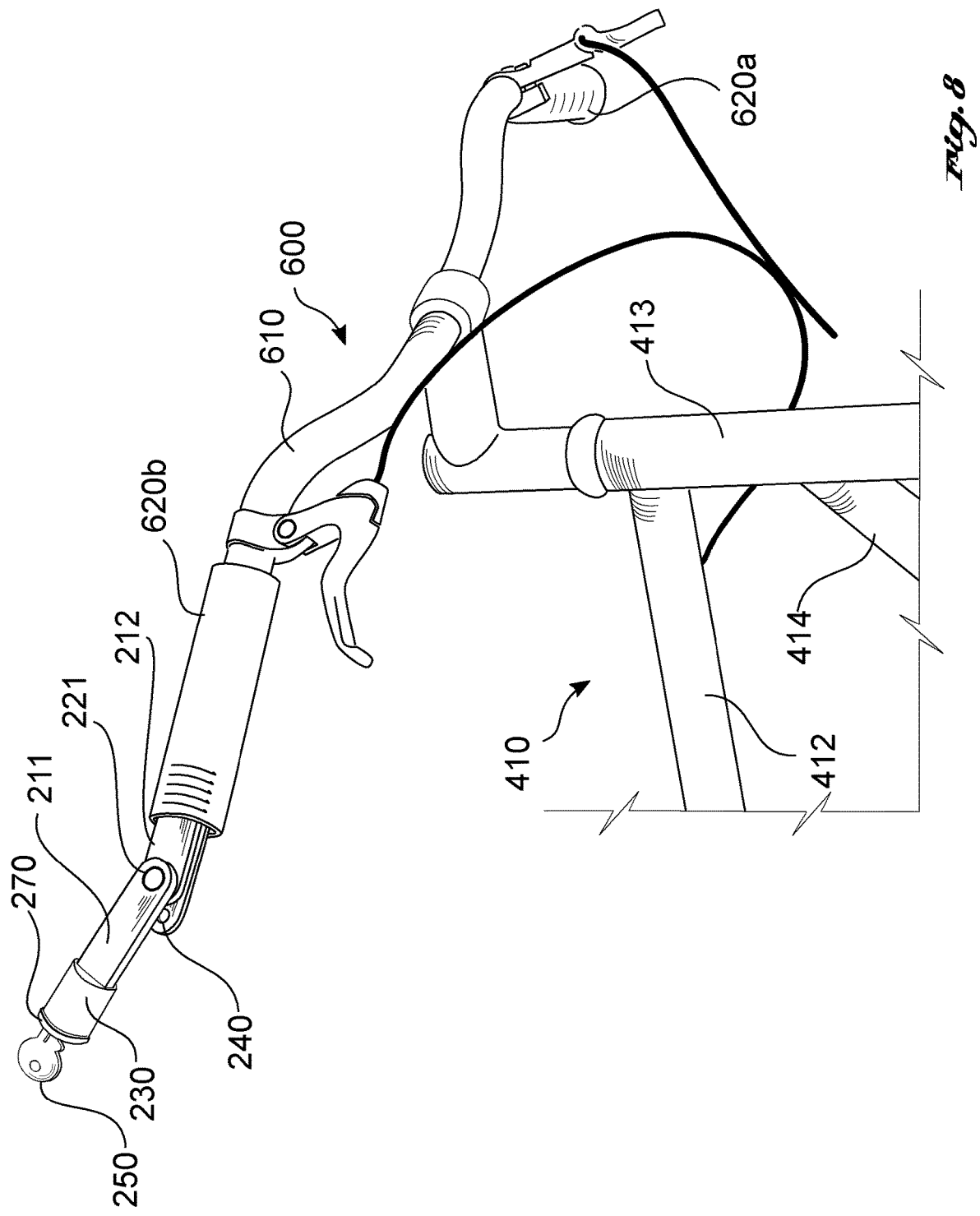
FIG. 8 shows a bicycle with an embodiment of a lock/handlebar combination according to the disclosure.

FIG. 8 shows a three-dimensional view of an embodiment of a lock/handlebar combination according to the disclosure. The shown embodiment of the lock/handlebar combination comprises a folding lock 200 according to the disclosure and a handlebar 600. The handlebar comprises grips 620*a*, 620*b*. In FIG. 8, the lock/handlebar combination is shown as part of a bicycle with a frame 410. The frame 410 comprises a top tube 412, a down tube 414 and a fork tube 413. The handlebar 600 comprises a handlebar tube 610. The handlebar tube 610 comprises an interior space with a free cross-section that is accessible at least from a first end portion of the handlebar 600 and is configured to accommodate the folding lock 200. In particular, the grip 620*b* of the handlebar 600 is not closed at its end face so that the interior space of the handlebar 600 is accessible for insertion of the folding lock 200. In the shown embodiment, the lock body 230 is formed to be substantially rotationally symmetrical so that the lock body 230 can be at least partially inserted into the handlebar 600. The lock body 230 furthermore comprises a substantially circumferential projection 270. This projection 270 is suitable for forming a stop so that the folding lock 200 cannot be fully inserted into the handlebar 600. Removal of the folding lock 200 can be simplified in this manner. An end face of the lock body 230 that is not visible in FIG. 8 comprises a cover member that is configured such that the handlebar 600 is closed in a fluid-tight manner following insertion of the folding lock 200. The circumferential projection 230 forms part of the cover member.

The invention claimed is:

1. A seat post for a bicycle or a moped, comprising a seat post tube, wherein said seat post tube comprises an opening member that is configured to allow a closure element of the seat post to perform a movement, by means of which a region inside the seat post tube can be accessed in order to insert or remove an elongated object, wherein said seat post tube comprises an upper portion and a lower portion opposite the upper portion, said upper portion being configured to be connected to a seat clamping device and/or to a seat,
    wherein the outer circumferential length of the seat post tube in the region of the lower portion is smaller than or the same as the outer circumferential length of the seat post tube in the region of the upper portion, and
    wherein the opening member comprises a hinge, a plug connection, a plug connection with at least one centring element, a plug connection with at least one anti-rotation element, a sliding connection, a clamping connection, parallel kinematics and/or shear kinematics.

2. The seat post according to claim 1, further comprising a fixing member that is configured to fix the closure element in a state in which the region inside the seat post tube is not accessible by an operator.

3. The seat post according to claim 2, wherein the fixing member comprises a clamp lock, a screw lock, a screw sleeve, a snap lock, a bayonet catch, a bolt lock, a slide lock and/or a bayonet catch sleeve.

4. The seat post according to claim 1, wherein the length of the seat post tube in the axial direction is at least 40 cm, at least 50 cm, or at least 55 cm, and wherein the length of the lower portion of the seat post tube in the axial direction is at least 10 cm, at least 20 cm, or at least 30 cm.

5. The seat post according to claim 1, wherein the outer circumferential length of the seat post tube in the lower portion deviates from the diameter of the seat post tube in the upper portion by a value of between 1 mm and 15 mm inclusive, between 2 mm and 10 mm inclusive, or between 2.5 mm and 9 mm inclusive.

6. The seat post according to claim 1, wherein the lower portion of the seat post tube comprises a first axis relative to which it is rotationally symmetrical, wherein the upper portion of the seat post tube comprises a second axis relative to which it is rotationally symmetrical, wherein the first axis substantially extends shifted parallel to the second axis, and wherein the distance between the first axis and the second axis is between 0.5 mm and 2.5 mm.

7. The seat post according to claim 1, wherein the lower portion of the seat post tube comprises a recess extending in the axial direction in the region of an outer circumferential surface.

8. The seat post according to claim 1, comprising a spring element comprising a compression spring element provided in the lower portion of the seat post tube, which is configured to pre-tension an object that can be inserted into the region inside the seat post in the direction of the closure element.

9. Use of a seat post according to claim 1 for storing a lighting device, a puncture kit, an air pump, a charger or an energy storage device in the region inside the seat post tube or the seat tube.

10. A locking system comprising a seat post according to claim 1, wherein the inside of the seat post tube or of a seat tube comprises at least one guide member that is configured to guide link segments of a folding lock during insertion of the link segments into the region inside the seat post tube or the seat tube, and that is further configured to substantially prevent movement of the link segments in a direction perpendicular to a central axis of the seat post tube or the seat tube.

11. The seat post according to claim 1, wherein the seat post tube comprises a clamping element in the region of the lower portion, which is connected to the seat post tube by a fastening element, said clamping element being configured such that actuation of the fastening element results in displacement of the clamping element, the direction of displacement being at least partially radial to the axis of the seat post tube.

12. The seat post according to claim 1, wherein the closure element is provided in the region of the upper portion.

13. A frame for a bicycle or a moped, comprising a seat tube that is connected to the frame by means of a material fit, said seat tube comprising an upper portion and a lower portion opposite the upper portion, wherein at the upper portion, the seat tube is connected via a hinge to a closure element that is configured to be connected to a seat clamping device and/or to a seat, wherein said closure element is further configured to be brought into an open position in which a region inside the seat tube is substantially accessible by an operator, and wherein said closure element is further configured to be brought into a closed position in which the region inside the seat tube is substantially not accessible by an operator, and wherein the seat tube comprises an intermediate piece that is connected to the seat tube by means of a clamping and/or screw connection, wherein the intermediate piece comprises the hinge that is connected to the closure element, and wherein the intermediate piece is configured such that a position of the seat clamping device or the seat can be changed relative to the axial direction of the seat tube.

14. The frame according to claim 13, further comprising a fixing member that is configured to fix the closure element in a state in which the region inside the seat post tube is substantially not accessible by an operator, wherein the fixing member comprises a clamp lock, a screw lock, a screw sleeve, a snap lock, a bayonet catch, a bolt lock, a slide lock and/or a bayonet catch sleeve.

15. A folding lock for protection against theft of a bicycle or moped, comprising a lock body and n link segments of a substantially flat design, wherein n is an integer greater than or equal to 3, wherein each link segment has a thickness d, wherein the direction of thickness is defined as the direction of least extension of each link segment, wherein a first, end link segment is connected to the lock body, wherein a second link segment is pivotably connected to the first link segment via a first hinge pin, wherein a third link segment is pivotably connected to the second link segment via a second hinge pin, and wherein a final, end link segment comprises a locking element that is configured to be locked together with a correspondingly configured counterpart in the lock body, wherein the extension of the entire folding lock in the direction of thickness is no more than $(n/2+1)*d*1.1$, and wherein at least two link segments each comprise a catch element configured as a magnet element, wherein the catch elements are arranged and are such that the at least two link segments can adopt an orientation in which the at least two link segments are oriented substantially parallel relative to the longitudinal direction thereof.

16. A lock/handlebar combination comprising a handlebar for a bicycle or a moped and comprising a lock for preventing theft of a bicycle or a moped, comprising the folding lock according to claim 15, wherein the handlebar comprises an interior space with a free cross-section that is accessible at least from a first end portion of the handlebar and that is configured to accommodate the lock.

17. The lock/handlebar combination according to claim 16, wherein a lock body that forms an end portion of the lock comprises a cover member that is configured such that the first end portion of the handlebar is closed in a fluid-tight manner following insertion of the lock.

18. The lock/handlebar combination according to claim 16, wherein the handlebar comprises a tube having a tube axis extending substantially centrally therein, wherein relative to the tube axis, the tube has exclusively radii of curvature that are greater than 28 mm, greater than 35 mm, or greater than 55 mm, and wherein the amount of free cross-section perpendicular to the tube axis inside the tube is indirectly proportional to the radius of curvature.

19. A seat post for a bicycle or a moped, comprising a seat post tube, wherein said seat post tube comprises an opening member that is configured to allow a closure element of the seat post to perform a movement, by means of which a region inside the seat post tube can be accessed in order to insert or remove an elongated object, wherein said seat post tube comprises an upper portion and a lower portion opposite the upper portion, said upper portion being configured to be connected to a seat clamping device and/or to a seat, wherein the closure element is provided in the region of the upper portion,
- wherein the outer circumferential length of the seat post tube in the region of the lower portion is smaller than or the same as the outer circumferential length of the seat post tube in the region of the upper portion, and
- wherein the lower portion of the seat post tube comprises a first axis relative to which it is rotationally symmetrical, wherein the upper portion of the seat post tube comprises a second axis relative to which it is rotationally symmetrical, wherein the first axis substantially extends shifted parallel to the second axis, and wherein the distance between the first axis and the second axis is between 0.5 mm and 2.5 mm.

20. A seat post for a bicycle or a moped, comprising a seat post tube, wherein said seat post tube comprises an opening member that is configured to allow a closure element of the seat post to perform a movement, by means of which a region inside the seat post tube can be accessed in order to insert or remove an elongated object, wherein said seat post tube comprises an upper portion and a lower portion opposite the upper portion, said upper portion being configured to be connected to a seat clamping device and/or to a seat, wherein the closure element is provided in the region of the upper portion,
- wherein the outer circumferential length of the seat post tube in the region of the lower portion is smaller than or the same as the outer circumferential length of the seat post tube in the region of the upper portion, and
- wherein the seat post tube comprises a clamping element in the region of the lower portion, which is connected to the seat post tube by a fastening element, said clamping element being configured such that actuation of the fastening element results in displacement of the clamping element, the direction of displacement being at least partially radial to the axis of the seat post tube.

* * * * *